Sept. 14, 1937.　　　G. M. PESTARINI　　　2,093,209
GENERATOR REGULATOR
Filed May 2, 1936　　　2 Sheets-Sheet 1

G. M. Pestarini
INVENTOR
By Glascock Downing Seebold
Attys.

Sept. 14, 1937.   G. M. PESTARINI   2,093,209
GENERATOR REGULATOR
Filed May 2, 1936    2 Sheets-Sheet 2

Patented Sept. 14, 1937

2,093,209

UNITED STATES PATENT OFFICE 2,093,209

GENERATOR REGULATOR

Giuseppe Massimo Pestarini, Grant City, N. Y.

Application May 2, 1936, Serial No. 77,644
In Italy May 6, 1935

13 Claims. (Cl. 171—97)

This invention concerns the distribution of electrical power with series connection of feeding points, wherein all generators and consumers are connected together in series forming a single ring generally traversed by a current of a substantially constant intensity.

When the circuit includes a plurality of generators, the problems arise of uniformly distributing the load among the power sources and preventing the terminal potential of said sources with respect to earth from exceeding a certain predetermined limit.

An object of this invention is to improve said power sources in order to meet automatically both requirements set forth above without requiring any attendance.

As power sources which may be utilized according to this invention I may mention the generators producing electric power in the form of current of constant value, as the Kraemer dynamo (often called three-wire generator) and the metadynes.

The metadyne is described in a number of patents and a detailed description of the metadyne principles is given in a paper entitled "Esquisse sur la Métadyne" by J. M. Pestarini in the "Bulletin Scientifique A. I. M." No. 4, April 1931 issued by the Association des Ingénieurs Electriciens published by the "Institut Electrotechnique Monteflore", of Liege, Belgium.

A metadyne essentially consists of a rotor with winding and commutator, carrying more than two brushes for each pair of poles in the winding, and a stator offering a magnetic circuit of low resistance to the flux generated by the rotor ampere turns.

According to the particular arrangement of the circuit, the metadyne may be either a metadyne generator which is driven by a prime mover and generates the current, or a metadyne transformer which transforms the electrical power supplied to it at a constant voltage into electric power of constant current.

In both cases the set of brushes called primary brushes is kept at a substantially constant potential difference and the other set of brushes, called secondary brushes, supply the current at substantially constant value. The working of the metadyne is based upon the fact that the E. M. F. induced between the primary brushes is essentially due to the flux generated by the rotor ampere turns due to the current flowing through the secondary brushes (called secondary current), and upon the symmetrical fact that the E. M. F. induced between the secondary brushes is essentially due to the flux generated by the rotor ampere turns due to the current flowing through the primary brushes (called primary current).

In the following description I refer more particularly to metadynes, the metadyne being best suited for feeding a series network, but the described improvements are also applicable to any dynamos generating a substantially constant current.

A further object of this invention is to provide means by which the characteristic of each source is modified whenever the load distribution becomes unbalanced or the potential of one of the terminals of the sources tends to exceed, with respect to earth, the limit potential, the modification of the characteristic thereby produced being such that the load tends again to be balanced among the various sources and the terminal potential sinks within admissible limits.

Several arrangements in accordance with the invention will now be described by way of example with reference to the drawings wherein.

Figures 1, 2:
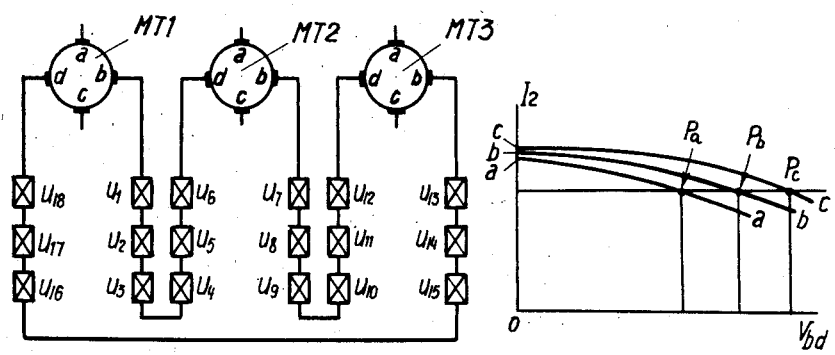
Figure 1 shows the general arrangement of a metadyne series network.
Figure 2 is a diagram of the characteristics of the system shown in Figure 1.

In Figure 1, the metadynes are denoted by MT1, MT2, MT3 and the consumers by U1, U2, . . . U18. The metadyne brushes $a$ and $c$ are supposed to be the primary brushes, while $b$ and $d$ are the secondary brushes.

The metadynes may be either transformer metadynes or generators, no distinction being made on the drawings in this connection. Should the metadynes be perfectly similar and rotate in perfect synchronism, the load would be equally distributed among them.

Practically, the metadynes are not identical on account of inequalities in construction, nor do they rotate in perfect synchronism. Therefore, the fundamental characteristics, see Fig. 2, are represented by three lines, $aa$, $bb$, $cc$, which are not perfectly coincident. The fundamental characteristic of a metadyne is the characteristic of the secondary current I₂ as a function of the voltage V_bd supplied by the metadyne to the circuit. We shall assume the fundamental characteristic to be a slightly inclined curve instead of a straight line parallel to the axis of the abscissae, the former case occurring in the practice. If the ordinate of the straight line Pa Pb Pc represents the actual value of the current, then the abscissae of the intersection points Pa Pb Pc represent the voltages supplied by the three metadynes, and therefore their respective loads. These voltages are different, and the metadyne terminal potentials, with respect to the earth, are different too.

According to the present invention, the metadynes are provided with special stator windings W, which slightly modify the characteristics of the metadynes, to improve the distribution of the loads and reduce the terminal potential with respect to the earth.

The winding according to this invention has its magnetic axis situated in such a direction as to induce an E. M. F. between the primary brushes.

By modifying the current in this winding to generate ampere turns, the component of which, on the commutating axis of the secondary brushes b d, has the same direction as the rotor ampere turns due to the secondary current, the whole fundamental characteristic of the metadyne is lowered; on the other hand if the current in the winding W is modified in such manner that the ampere turns generated by said current have a component on the commutating axis of the secondary brushes b and d in a direction opposite to that of the rotor ampere turns due to the secondary current, the whole fundamental characteristic of the metadyne is raised.

The winding W will be referred to hereinafter for convenience as "variator".

According to the present invention the variator windings act upon the metadynes which constitute the main source of power supplied to the circuit, lowering and raising their characteristic so as to cause the main metadynes to absorb practically equal parts of the total load and the potential of their brushes towards the earth potential, as it varies with the load, to remain practically the same for all the metadynes.

This action is obtained according to the invention either by providing the main metadynes with variator windings including a main variator winding having its ampere turns adjusted to set up in the metadyne a current having a mean value within the desired range and complementary variator windings, each of which has a corrective action and is sensitive to the load or to the potential of the brushes towards the earth potential, or by providing the main metadynes with one variator winding traversed by a current which is adjusted above or under a mean value by means which are sensitive to the load or to the potential of the brushes towards the earth potential. The said adjustment of the resultant ampere turns of the plurality of variator windings or the ampere turns of the variator winding is obtained according to the present invention by a special wiring hereinafter indicated.

Figure 3:
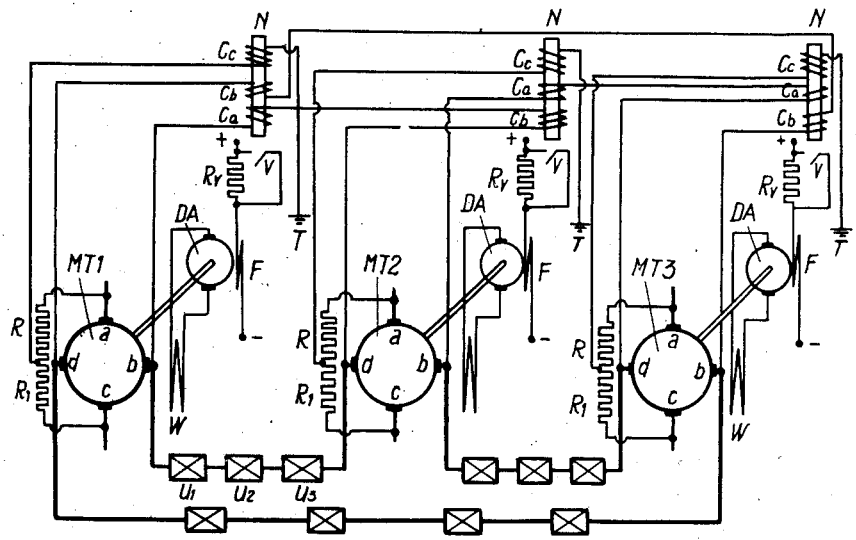
Fig. 3 shows an arrangement with the three sources, a dynamo feeding the variator winding controlling the current of the sources, and a vibrator regulating the excitation of said dynamos.

The connections are either applied directly to the complementary variator windings, to a plurality of coils controlling a vibrating regulator which in turn controls the current in the variator winding or said special connections are applied to windings controlling the current of exciters supplying current to the variator winding of the main metadynes. Considering Fig. 3, three main metadynes MT1, MT2 and MT3 are shown inserted in the main loop by their secondary brushes b and d. The main loop is shown by thick lines and a main metadyne as source of power, and a plurality of consumers indicated by rectangles as U1, U2, U3 are alternatively connected in series therein. The primary brushes of the metadynes are indicated by a and c. Each metadyne is provided with a variator winding W fed by an exciter dynamo DA. Current is fed to the field winding F of said dynamo by a source, not shown in Figure 3, through terminals indicated by the signs + and −. The current in the field winding F is controlled by the vibrations of the contact V which inserts or short-circuits the resistance Rv. The contact V is magnetically operated by the core N of a vibrator. The attractive force of this core responds to the currents of the coils Ca, Cb, Cc. Thus the adjustment of the current in the field winding F and, consequently, in the variator winding W is affected by the voltage feeding the coils Ca, Cb, Cc. The coils Cc are connected in parallel between the earth T and the middle point of a resistor R, R1 of high ohmic resistance, connected across the primary brushes of the main metadynes. In this manner the action of the coils Cc is affected by the mean difference of the potential of the brushes of the metadyne with respect to the earth. Therefore, as the mean potential of the brushes of a metadyne with respect to the earth increases, the corresponding vibrating regulator under the action of the coil Cc tends to decrease the current in the variator winding W, hence the secondary voltage supplied by the metadyne through its brushes b and d and the difference of the mean potential of its brushes with respect to earth. The two coils Ca, Cb respond to the voltage absorbed by the consumers directly to the left and right, respectively, of their associated metadyne. The coil Ca of the vibrator associated with the metadyne MT1 is connected in series with the coil Cb of the variator associated with the metadyne MT2 and both of them are connected across the brush b of the metadyne MT1 and brush d of the metadyne MT2. Therefore, said two coils respond to the voltage required by the consumers U1, U2, U3, that is to the load absorbed by said consumers. When this load increases, the current in the variator windings of the metadynes MT1 and MT2 is increased by virtue of the action of the above mentioned coils Ca, Cb and the characteristic of the metadynes MT1 and MT2 is raised, their output being increased accordingly. The coil Cb of the vibrating regulator associated with the metadyne MT1 is connected in series with the coil Cb of the vibrating regulator associated with the metadyne MT3, and these coils are connected across the brush d of the metadyne MT1 and brush b of the metadyne MT3, so that they respond to the load absorbed by the consumers connected between said two brushes, and their action causes the metadynes MT1 and MT3 to raise their characteristic as the load of said consumers increases.

A similar function is performed by the two coils Ca of the vibrating regulator associated with the metadyne MT2 and the coil Ca of the vibrating regulator associated with the metadyne MT3. Their simultaneous action insures a uniform distribution of the voltage among the three metadynes minimizing any possible difference of mean potential of their brushes towards the earth.

Figure 4:
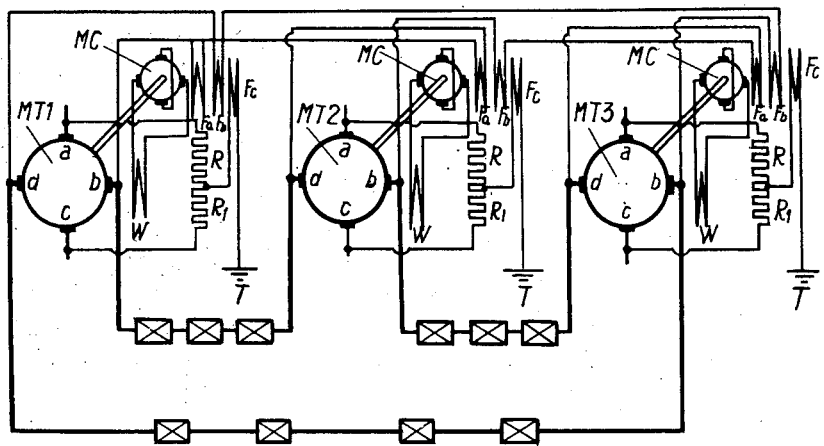
Fig. 4 shows another arrangement in which the variator windings of the metadyne's main sources of energy, are fed by exciter metadynes controlled by a plurality of members of variator windings.

Fig. 4 diagrammatically shows a modification embodying the present invention. The three main metadynes MT1, MT2 and MT3 have their variator windings W fed by the secondary brushes of an exciter metadyne MC, the primary brushes of which are short-circuited. The regulation of the secondary voltage supplied by each metadyne and difference of mean potential of the brushes of each metadyne towards the earth is obtained by the action of the three coils Fa, Fb, Fc connected in a manner similar to the coils Ca, Cb, Cc shown in Fig. 3, but acting as elements of a secondary variator winding of the exciter metadyne MC.

In order to relieve the task of the three elements Fa, Fb, Fc, of the secondary variator winding of the exciting metadynes MC, each of these exciting metadynes MC is provided with a further variator element which may be called fundamental variator, setting up constant ampere turns corresponding to the mean value of the total ampere turns to be set up by all the elements of the secondary variator winding. Then the three members Fa, Fb and Fc of the secondary variator winding of the exciting metadyne MC will have only a corrective function.

Fig. 4 shows the exciting metadyne MC with its primary brushes short-circuited, though exciting metadynes with their primary brushes connected to a constant voltage source may also be adopted.

Figure 5:
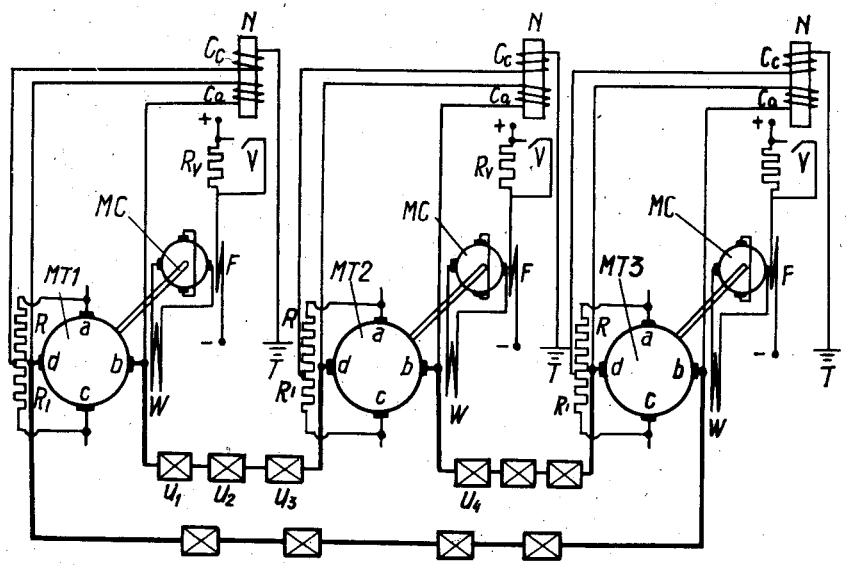
Fig. 5 is a further arrangement in which the exciter metadynes are controlled by vibrators.

Fig. 5 shows another modification. The three main metadynes have their variator winding W fed by an exciter metadyne MC, the secondary variator winding F of which is traversed by a current controlled by a vibrating regulator. The coils which energize the vibrating regulator are two in number, Cc and Ca. The coil Cc, inserted between the earth T and the middle point of a high resistance R, R1 connected across the primary brushes of the main metadyne tends to lower the main characteristic of the corresponding metadyne, as the mean difference of potential of its brushes towards the earth increases. The secondary coil Ca energizing the vibrating regulator is connected across the secondary brushes of the main metadyne and tends to lower the characteristic of the main metadyne as the secondary voltage supplied by the latter increases. Thus a satisfactory regulation is obtained and the voltage is uniformly distributed among the main metadyne, the mean difference of potential of the brushes of the main metadyne towards the earth tending to be the same for all the metadynes.

Although the wirings described above refer to metadynes, the invention may be applied to generators employed as sources of power in a series network.

In the case of a metadyne generator provided with a primary dynamo, the invention may be applied by acting on the voltage of the primary dynamo instead of on the variator of the generator metadyne; in fact, as the value of the secondary current varies in the same direction as the primary voltage, by modifying the primary voltage the whole fundamental characteristic of the metadyne is modified; more particularly, by increasing the primary voltage, the characteristic is raised, and by decreasing the primary voltage the fundamental characteristic is lowered.

In this case there will be as many field windings in the primary dynamo as there were variators in the previously described arrangements.

In all the figures illustrating a whole network, the sources are shown to be separated from one another by a certain number of consumers; it is however obvious that the source might be connected to form a unit.

What I claim is:

1. In a series network comprising a plurality of metadynes and a plurality of consumers, a regulator to uniformly distribute load among said metadynes and to prevent formation of high potentials with respect to earth, comprising an auxiliary metadyne for each main metadyne, a variator winding on each main metadyne fed by said auxiliary metadyne, a plurality of variator windings on the auxiliary metadyne responsive to the voltages of the consumers and to the potential difference between the main metadyne associated therewith and the earth.

2. In a series network comprising a plurality of metadynes and a plurality of consumers, a regulator to uniformly distribute load among said metadynes and to prevent formation of high potentials with respect to earth, comprising an auxiliary metadyne for each main metadyne, a variator winding on each main metadyne fed by said auxiliary metadyne, a plurality of variator windings of which one is connected across a point of the main metadyne and the earth, a further variator winding being connected across the two secondary brushes of the associated metadyne.

3. In a series network comprising a plurality of metadynes and a plurality of consumers, a regulator to uniformly distribute load among said metadynes and to prevent formation of high potentials with respect to earth, comprising an auxiliary metadyne for each main metadyne, a variator winding on each main metadyne fed by said auxiliary metadyne, a plurality of variator windings of which one is connected across a point of the main metadyne and the earth, two further variator windings connected with the secondary brushes of the metadyne and in series together being adapted to generate ampere turns proportional to the voltage required by the consumers on both sides of the associated metadyne.

4. In a series network comprising a plurality of metadynes and a plurality of consumers, a regulator to uniformly distribute load among said metadynes and to prevent formation of high potentials with respect to earth, comprising an auxiliary metadyne for each main metadyne having its brushes short-circuited, a variator winding on each main metadyne fed by said auxiliary metadyne, a plurality of variator windings on the auxiliary metadyne responsive to the voltages of the consumers and to the potential difference between the main metadyne associated therewith and the earth.

5. In a series network comprising a plurality of metadynes and a plurality of consumers, a regulator to uniformly distribute the load among said metadynes and to prevent formation of high potentials with respect to earth comprising an auxiliary metadyne for each main metadyne having its brushes short-circuited, a variator winding on each main metadyne fed by said auxiliary metadyne, a plurality of variator windings of which one is connected across a point of said metadyne and the earth, a further variator winding being connected across the two secondary brushes of the associated metadyne.

6. In a series network comprising a plurality of metadynes and a plurality of consumers, a regulator to uniformly distribute the load among said metadynes and to prevent formation of high potentials with respect to earth comprising an auxiliary metadyne for each main metadyne, having its brushes short-circuited, a variator winding on each main metadyne fed by said auxiliary metadyne; a plurality of variator windings of which one is connected across a point of the main metadyne and the earth, two further variator windings connected with the secondary brushes of the metadyne and in series together being adapted to generate ampere turns proportional to the voltages required by the consumers on both sides of the associated metadyne.

7. In a series network comprising a plurality of sources of direct current and a plurality of consumers, a regulator winding in each source of direct current and means for causing said regulator winding to produce ampere turns which vary the characteristics of said sources so as to uniformly distribute the load among them and prevent their potential with respect to earth from exceeding a predetermined value.

8. In a series network, comprising a plurality of metadynes and a plurality of consumers, a regulator winding applied to the stator of each metadyne and adapted to uniformly distribute the load among said metadynes and reduce the potential at the terminals of said metadynes with respect to earth and means for varying the current in said stator regulator winding proportionally to the variations in the load in order to balance them.

9. In a series network comprising a plurality of metadynes and a plurality of consumers, a regulator winding applied to the stator of each metadyne, an auxiliary generator for feeding said regulator winding, a field winding for said auxiliary generator, a vibrator controlling the circuit of said field winding and windings on said core, of which windings one is connected across a point on the metadyne and earth and the other across the secondary brushes of said metadynes.

10. In a series network comprising a plurality of metadynes and a plurality of consumers, a regulator winding applied to the stator of each metadyne, an auxiliary generator for feeding said regulator winding, a field winding for said auxiliary generator, a first resistor connecting the primary brushes of each metadyne, a second resistor in the field winding of each auxiliary generator and a vibrator for short-circuiting said second resistor and windings on the core of said vibrator, of which windings one is connected across the middle point of said first resistor and the earth and the other across the secondary brushes of said metadynes.

11. In a series network comprising a plurality of metadynes and a plurality of consumers, a regulator winding applied to the stator of each metadyne and adapted to uniformly distribute the load between said metadynes and reduce the potential at the terminals of said metadynes with respect to earth, an auxiliary generator for feeding said regulator winding, a field winding for said auxiliary generator, a first resistor connecting the primary brushes of each metadyne, a second resistor in the field winding of each auxiliary generator, a vibrator for short-circuiting said second resistor, a winding on the core of said vibrator connected with the middle point of said first resistor and earth, a second winding in said core connected in series with the corresponding winding of the adjacent metadyne at one end and with the secondary adjacent brushes of said adjacent metadynes and a third winding on said core connected in series with the corresponding winding of the adjacent metadyne at the other end and with the adjacent brushes of said two metadynes.

12. A series network, as claimed in claim 9, in which the auxiliary generator is a metadyne.

13. In a series network comprising a plurality of main metadynes and a plurality of consumers, a regulator winding applied to the stator of each metadyne and adapted to uniformly distribute the load between said metadynes and reduce the potential at the terminals of said metadynes with respect to earth, an auxiliary metadyne for feeding said regulator winding directly coupled with its respective main metadyne, a field winding for said auxiliary metadyne, a first resistor connecting the primary brushes of each main metadyne, a second resistor in the field winding of each auxiliary metadyne, a vibrating regulator for short-circuiting said second resistor, a winding on the core of said vibrating regulator connected across the secondary brushes and a second winding on the core of said vibrating regulator connected with the middle point of said first resistor and with the earth.

GIUSEPPE MASSIMO PESTARINI.